United States Patent [19]
Green

[11] 3,943,236
[45] Mar. 9, 1976

[54] REFORMING PROCESS FOR CARBON MONOXIDE

[75] Inventor: Ralph V. Green, Charleston, W. Va.

[73] Assignee: E. I. Du Pont de Nemours and Company, Wilmington, Del.

[22] Filed: Oct. 17, 1973

[21] Appl. No.: 407,263

Related U.S. Application Data

[63] Continuation-in-part of Ser. No. 130,613, April 2, 1971, abandoned.

[52] U.S. Cl............. 423/415 R; 423/653; 252/373; 48/197 R; 48/214 R
[51] Int. Cl.².................................... C01B 31/18
[58] Field of Search ............. 252/373; 48/197, 214; 423/415, 652, 653

[56] References Cited
UNITED STATES PATENTS

| | | |
|---|---|---|
| 1,719,867 | 7/1929 | Arsem .................................. 423/415 |
| 2,526,521 | 10/1950 | Voorhies, Jr. ................... 423/415 X |
| 2,671,721 | 3/1954 | Gilliland .......................... 423/415 X |
| 3,475,160 | 10/1969 | Heinzelmann ................... 252/373 X |

*Primary Examiner*—Earl C. Thomas

[57] ABSTRACT

Hydrocarbons are reformed with steam to produce synthesis gas or hydrogen and carbon monoxide. This reforming process can be improved if after the carbon monoxide in the reformer effluent is removed, the remaining effluent, essentially hydrogen, is recycled to the reformer. Carbon dioxide must be added to the reformer inlet in an amount to balance the hydrogen present in the recycle. By this process larger quantities of carbon monoxide relative to the hydrogen produced can be realized.

3 Claims, 1 Drawing Figure

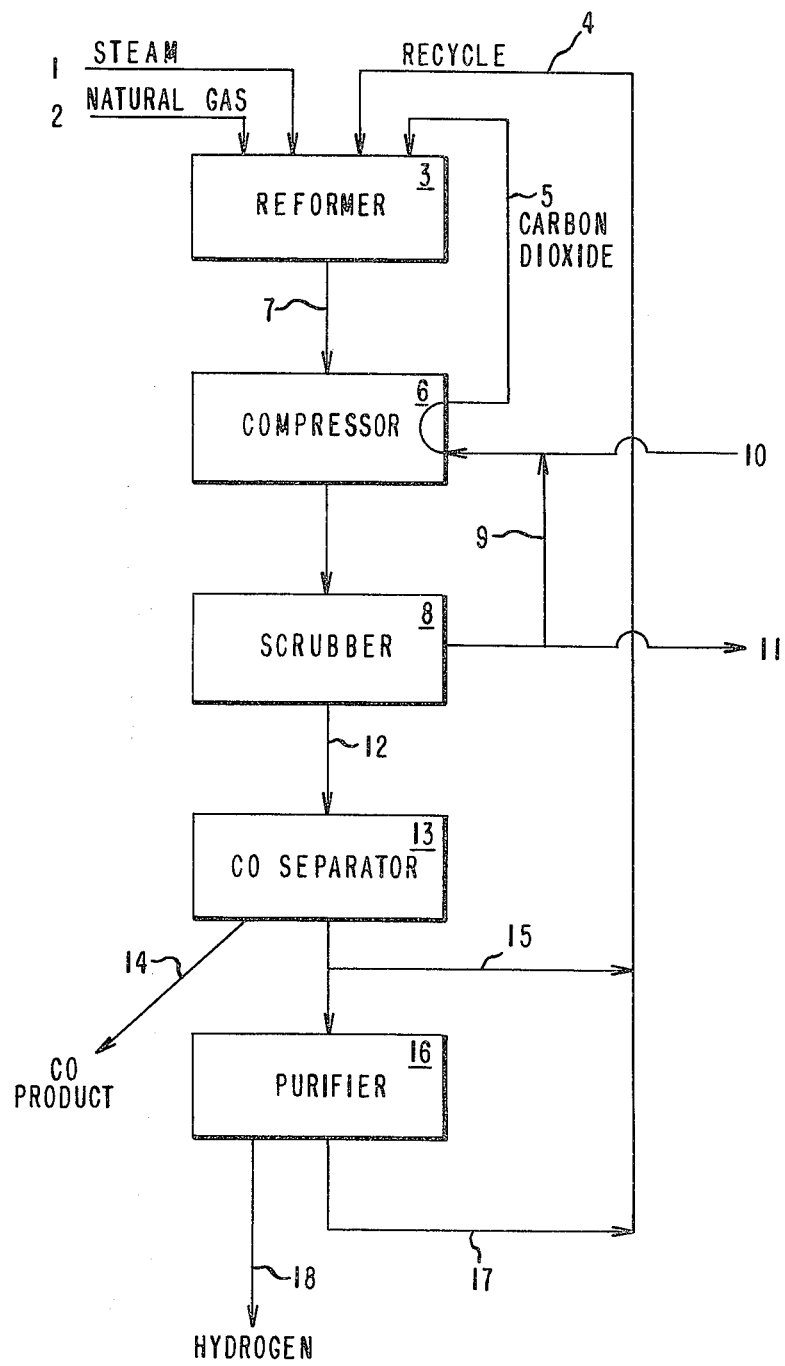

REFORMING PROCESS FOR CARBON MONOXIDE

CROSS-REFERENCE TO RELATED APPLICATIONS

This application is a continuation-in-part of my copending application Ser. No. 130,613, filed Apr. 2, 1971, and now abandoned.

BACKGROUND OF THE INVENTION

Catalytic steam-hydrocarbon reforming is the major method employed by industry for producing carbon monoxide or synthesis gas mixtures, e.g., carbon monoxide and hydrogen. In this process gaseous hydrocarbons, such as methane and ethane, or hydrocarbons which may be vaporized at moderate temperatures, such as propane, butane, and other normally liquid hydrocarbons up to and including heptane and octane are reacted under pressure with steam over a nickel catalyst at 650°–1000°C. to produce carbon oxides and hydrogen. The primary reaction products are then processed further in various ways, depending on the final use and on the purity required.

In this conventional reforming process, the reformer product or effluent contains hydrogen and carbon monoxide at a ratio of $H_2$ to CO of at least 2:1 and as high as 5:1 to 7:1. The lower ratios have been obtained by the addition of carbon dioxide to the reformer feed. However, for many uses the amount of hydrogen produced by the reforming process is still in excess of that ultimately needed, thus must be vented or burned as fuel.

SUMMARY OF THE INVENTION

I have discovered that this conventional process can be improved if after the carbon monoxide has been removed from the reformer effluent, at least a portion of the reformer effluent is recycled to the reformer inlet. In this process carbon dioxide must also be added to the reformer in an amount at least equivalent to the amount of hydrogen present in the recycle stream, i.e., at least one mole of carbon dioxide for every mole of hydrogen in the recycle stream.

This change results in a reduction of the hydrocarbon feed required and further reduces the cost of operation since the recycled hydrogen is used to produce the desired product rather than using it as a fuel.

The process can be used whenever a convenient carbon dioxide source is available and the desired product of the primary reformer is essentially all carbon monoxide or the desired ratio of $H_2$ and CO products is less than 2:1.

DESCRIPTION OF THE DRAWINGS

The FIGURE is a flow sheet of the process of the invention.

DETAILED DESCRIPTION OF THE INVENTION

The process of the invention can be easily adapted to conventional carbon monoxide reforming processes. The conventional equipment can continue to be used and the only modifications required are with respect to the flow ratios of the various components of the reformer feed and the addition of the recycle stream.

In the reforming process, a desulfurized hydrocarbon, e.g., ethane, propane, butane, naptha, methane, etc. usually natural gas, is preheated to about 300°–550°C. and fed to a reformer along with superheated steam. In the reformer the hydrocarbon and steam are at pressures of 20 to 500 psig, generally about 40 psig to 300 psig and at temperatures of 650°–1000°C., generally about 850°C. The mixture passes through an active nickel catalyst and the following basic reaction occurs:

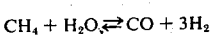

Other reactions can occur in the reformer to produce carbon dioxide:

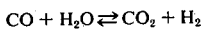

The effluent from the reformer consists of hydrogen, carbon monoxide, carbon dioxide, steam, methane, and nitrogen.

In the conventional process the ratio of steam to hydrocarbon, e.g., natural gas, is about 1.5 to 5.0:1. In the process of the invention, in view of the recycle of hydrogen, the ratio of steam to natural gas can be reduced to 1:1 or even lower. The hydrogen in the recycle, along with the added carbon dioxide, will make needed steam in the reformer according to the following reaction:

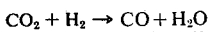

It may be possible to eliminate the need for any steam in the recycle process of the invention if the hydrogen and carbon dioxide can create the necessary amount of steam in situ in the reformer.

The amount of hydrocarbon feed, e.g., natural gas, is also reduced in the process of the invention. The amount of reduction is based on the amount of hydrogen added to the recycle stream, i.e., the amount must be reduced to maintain the desired stoichiometric balance due to the recycle of hydrogen.

As previously set forth, when the recycle stream, principally hydrogen, is fed to the reformer, at least an equivalent amount of carbon dioxide must be fed to the reformer. By equivalent amount it is meant the amount necessary to balance the following reaction:

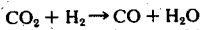

Thus for every mole of hydrogen in the recycle, at least one mole of carbon dioxide should be FIGURE. Note that if the reforming process previously used carbon dioxide in the feed, the additional amount of carbon dioxide equivalent to the hydrogen present in the recycle stream must still be added.

The process of the invention will now be described with reference to the flow sheet set forth in the Figure.

Superheated steam 1 at 20 to 500 psig, usually about 50 psig to 200 psig and desulfurized natural gas 2 at about 300°–520°C. are fed to the reformer 3. The ratio of steam to natural gas can be 1:1 or lower, depending upon the amount of hydrogen in the recycle stream 4.

The reformer is conventional and contains a nickel catalyst and is operated at 50–200 psig, usually about 40 psig and at a temperature between 650°–1000°C., and usually about 850°C.

Also a component of the reformer feed is the recycle stream 4. This stream can be a purified hydrogen stream containing 95 to 98 percent by volume hydrogen and the remainder nitrogen and methane or it can contain less hydrogen and some carbon oxides. The purified stream, as will be explained subsequently, is obtained when the off gas from the carbon monoxide removal step is further purified by various processes such as passing through a shift converter, scrubbing with hot potassium carbonate or a methanation step. The recycle stream may also be the hydrogen product directly after CO removal.

The recycle stream is also preheated before being fed to the reformer.

The final component of the reformer feed is carbon dioxide 5. The carbon dioxide can come from any convenient source 10 and should be compressed to the reformer pressure, i.e., 20 to 500 psig, in a compressor 6. As illustrated in the FIGURE, the carbon dioxide is compressed in one stage of a multi-stage compressor 6.

The output of the reformer 7 is a mixture of carbon dioxide, carbon monoxide, hydrogen, nitrogen and methane. This mixture is compressed to about 400 psig in the compressor and fed to a scrubber 8.

In the scrubber, hot potassium carbonate at 90°–120°C. is used to remove the $CO_2$ from the mixture. This $CO_2$ can be recovered by the regeneration of the potassium carbonate in a unit not illustrated. The recovered $CO_2$ can be added to the $CO_2$ feed 9 or it can be transferred for other uses 11. If desired, the carbon dioxide could be removed with water or ethanolamine according to the known techniques.

The output 12 from the scrubber 8, essentially carbon monoxide, hydrogen, nitrogen and methane is then cooled and fed to a CO separator 13. In this unit the desired CO product 14 is separated and transmitted for further processing as desired.

This unit can be any conventional CO separator, such as a copper liquor scrubber, i.e., a cuprous ammoniacal solution, or by a low temperature distillation, i.e., below −312°F., or the like. The cuprous ammoniacal solution is usually cuprous ammoniacal acetate or cuprous ammonium formate or a mixture of the two.

The remaining gas, which will be essentially hydrogen with minor amounts of carbon monoxide, nitrogen and methane can be totally or partially recycled directly to the reformer through line 15. Or the gas can be further purified in various units 16 such that it is essentially hydrogen and then recycled to the reformer through line 17. If desired, a portion of the purified hydrogen can be taken off through line 18 for use in processes where hydrogen is required.

The purifying units can be any of the conventional units used for this purpose, such as a shift-converter, a pressure swing absorption unit, or a methanation unit.

In an exemplary operation, 1420 pounds per hour of steam 1 and 965 MCFD of natural gas 2 are fed into a reformer 3 operating at 40 psig and 870°C. The recycle stream to this reformer is an unpurified stream 15 and has the following composition:

| | |
|---|---|
| carbon monoxide | 246 |
| hydrogen | 4616 |
| nitrogen | 137 |
| methane | 47 |
| | 5046 MCFD |

The $CO_2$ 5 is fed to the reformer at the rate of 2215 MCFD.

The output of the reformer 7 has the following composition:

| | |
|---|---|
| $CO_2$ | 550 |
| CO | 2846 |
| hydrogen | 5706 |
| nitrogen | 162 |
| methane | 55 |
| | 9319 MCFD |

This output is compressed to 400 psig and the $CO_2$ is removed in a hot potassium carbonate scrubber 8. The output from the scrubber 12 has the following composition:

| | |
|---|---|
| CO | 2846 |
| hydrogen | 5706 |
| nitrogen | 162 |
| methane | 55 |
| | 8769 MCFD |

The scrubber output is fed to a copper-liquor scrubber 13 where most of the CO is separated. The remaining gas is divided up into the recycle 15 of 5046 MCFD and the remainder is a hydrogen product, which after methanation has the following composition:

| | | |
|---|---|---|
| $H_2$ | = | 845 MCFD |
| $N_2$ | = | 25 |
| $CH_4$ | = | 18 |
| | | 888 MCFD |

I claim:

1. In the manufacture of carbon monoxide by the steam reforming of hydrocarbons in the presence of a nickel catalyst under pressures of 20 to 500 psig at temperatures of 650° to 1000°C. to produce a reformer effluent which contains hydrogen, carbon dioxide, and carbon monoxide, and thereafter compressing said reformer effluent and first separating the carbon dioxide from the reformer effluent and then separating and recovering the carbon monoxide from the reformer effluent, the improvement comprising recycling and preheating at least a portion of the reformer effluent remaining after the carbon monoxide has been separated to the feed to the reformer inlet and adding carbon dioxide to the reformer feed in an amount of at least one mole of carbon dioxide for every mole of hydrogen in the recycle stream.

2. The process of claim 1 wherein the recycle stream is purified such that it is essentially hydrogen.

3. The process of claim 1 wherein the ratio of hydrogen to carbon monoxide in the reformer effluent is less than 2:1.

* * * * *